(12) United States Patent
Martinez

(10) Patent No.: US 10,035,302 B1
(45) Date of Patent: Jul. 31, 2018

(54) UNIVERSAL FLOOR SEAM SEALER

(71) Applicant: Leo Martinez, Buena Park, CA (US)

(72) Inventor: Leo Martinez, Buena Park, CA (US)

( * ) Notice: Subject to any disclaimer, the term of this patent is extended or adjusted under 35 U.S.C. 154(b) by 0 days.

(21) Appl. No.: 15/731,306

(22) Filed: May 22, 2017

(51) Int. Cl.
| | |
|---|---|
| *B29C 65/02* | (2006.01) |
| *B29C 65/52* | (2006.01) |
| *E04F 15/16* | (2006.01) |
| *E04F 21/20* | (2006.01) |
| *B29L 31/00* | (2006.01) |

(52) U.S. Cl.
CPC .............. *B29C 65/52* (2013.01); *B29C 65/02* (2013.01); *E04F 15/16* (2013.01); *E04F 21/20* (2013.01); *B29L 2031/732* (2013.01)

(58) Field of Classification Search
USPC .. 156/17, 307.2, 308.4, 308.6, 309.6, 309.9, 156/500, 574, 575, 578
See application file for complete search history.

(56) References Cited

U.S. PATENT DOCUMENTS

| | | | | |
|---|---|---|---|---|
| 2,862,543 | A * | 12/1958 | Kaminsky | B29C 65/12 156/308.6 |
| RE24,801 | E * | 3/1960 | Kaminsky | B29C 65/12 126/271.1 |
| 4,933,220 | A * | 6/1990 | Petzold | E04F 15/18 427/256 |
| 5,656,126 | A * | 8/1997 | Martinez | B29C 65/12 156/304.1 |
| 5,725,722 | A * | 3/1998 | Eshleman | A47G 27/0443 156/304.6 |
| 6,871,013 | B2 * | 3/2005 | Martinez | B29C 65/12 156/575 |
| 7,571,753 | B2 * | 8/2009 | Martinez | B29C 65/12 156/497 |
| 7,695,210 | B1 * | 4/2010 | Martinez | B05C 17/00503 401/193 |

(Continued)

FOREIGN PATENT DOCUMENTS

| | | | | |
|---|---|---|---|---|
| EP | 0775460 A1 | * | 5/1997 | ......... A47G 27/0443 |
| JP | 09177296 A | * | 7/1997 | ......... A47G 27/0443 |

OTHER PUBLICATIONS

English Abstract of JP 09-177296 (Apr. 26, 2018).*
Catalog Turbo Heat Welding Tools,Jan. 2016, p. 2 Turbo precision nozzle.

*Primary Examiner* — Sing P Chan
(74) *Attorney, Agent, or Firm* — Charles M. Thomas

(57) ABSTRACT

A hand-held, portable floor seam sealing device is provided that has universal application to many commercially available floor sheet materials, including vinyl, linoleum, rubber, sport floors as well as other flooring sheet materials. The device employs a seam sealing welding gun and a nozzle of unique configuration defining a cavity bounded by a front end with two rows of at least eight air jet apertures directed toward a gap formed between forwardly projecting glue stick receiving flanges. The nozzle also through has a downwardly directed fin that terminates in a multiplicity of downwardly directed air jet discharge apertures. As the device is moved along the length of a seam between adjacent sheets of flooring, hot air from the apertures in the downwardly directed air jet discharge ridge preheats the portion of the seam into which sealant is about to be dispensed while hot air from the air jet apertures in the front end of the nozzle melts the sealant.

18 Claims, 8 Drawing Sheets

(56) References Cited

U.S. PATENT DOCUMENTS

| | | | |
|---|---|---|---|
| 9,004,130 B2* | 4/2015 | Martinez | B29C 66/1142 |
| | | | 156/368 |
| 9,820,600 B2* | 11/2017 | Despins | A47G 27/0487 |
| 2004/0094576 A1* | 5/2004 | Martinez | B29C 65/12 |
| | | | 222/146.5 |
| 2008/0142164 A1* | 6/2008 | Martinez | B29C 65/12 |
| | | | 156/497 |
| 2016/0221026 A1* | 8/2016 | Despins | A47G 27/0487 |
| 2017/0157840 A1* | 6/2017 | Kodera | E04F 15/02016 |

* cited by examiner

UNIVERSAL FLOOR SEAM SEALER

BACKGROUND OF THE INVENTION

Field of the Invention

The present invention is a device employing a heat nozzle of unique design and which includes a portable, handheld seam sealing welding gun for dispensing molten sealant to join adjacent sheets of flooring together.

Description of the Prior Art

In laying flooring that is sold commercially in sheets, such as vinyl, linoleum or rubber flooring, adjacent sheets of flooring are positioned side-by-side and cut to the desired shape. The flooring sheets are secured to the floor by adhesive compound. The compound is first applied to the floor and the cut sheets of flooring are laid in position atop the floor, one by one. Once each sheet of flooring is laid, the next adjacent flooring sheet is brought into position and pressed against the floor with the linear edges of adjacent flooring sheets residing in mutual side-by-side abutment.

A groove is then created along the length of the abutting edges of the sheets of flooring. The width of the groove has been largely standardized at 0.100 inches. A seam sealing tool is then employed to lay down a length of thermoplastic sealant into the groove, melting it as the sealant reaches the groove in the abutting edges of the floor surfaces. The stick of sealant is sometimes referred to as a welding rod.

Handheld, portable seam sealing tools have been utilized for this purpose for many years. One such device is described in U.S. Pat. No. 5,656,126, which is incorporated herein by reference in its entirety. Such tools employ a heat gun. A blower and a heater are incorporated into the body of such a heat gun. The blower draws air into the tool from the rear, where it is heated and then blows it into a hollow heat conducting member. The heat conducting member has a nozzle connected to its forward end that receives both the blast of hot air and also a solidified stick of thermoplastic sealant. The sealant is melted in the nozzle by the hot air and the molten sealant is discharged into the groove from the sealant dispensing mouth of the nozzle.

Through the years the composition of the sealants employed commercially in laying flooring sheets has changed. Many sealants that now enjoy commercial popularity include a urethane finish. Commercially available flooring with which the sealants are used include linoleum, vinyl, rubber, sports floors and other sheet materials of varying composition. Approximately 50% of flooring sheets currently sold commercially in the United States are fabricated from vinyl. Rubber and linoleum each account for between about 20%-30% of the market in sheet flooring.

One nozzle previously devised for use with otherwise conventional portable, handheld seam sealing tools has been sold commercially by Turbo Heat Welding Tools, located in Buena Park Calif., as the "carbon less nozzle", also known as the "Precision Nozzle", which is the term used hereinafter to describe this prior art device. Unlike previous nozzles for portable, handheld seam sealing tools, the Precision Nozzle does not employ an enclosed chamber for receiving a stick of sealant, but rather a pair of forwardly projecting flanges extending from the tubular casing of the nozzle that receives the heated air. The upper and lower forwardly projecting flanges in the Precision Nozzle are separated from each other by a gap of about ⅞ of an inch. In the front wall of the Precision Nozzle there is an array of two rows of forwardly directed air jet ports air jet ports each 0.062 inches in diameter with a seven ports in each row. These air jet ports direct heated air onto the stick of sealant that passes through guide loops in the flanges. The heated air emanating from the forwardly directed jet ports heats and softens the sealant to a molten state as it reaches the groove between the adjoining sheets of flooring.

The Precision Nozzle also has a downwardly directed hollow fin projecting from the tubular casing of the nozzle. The fin terminates at its lower extremity in a linear, bottom air jet discharge ridge or floor beam The ridge is about 1 inch in length and is located just to the rear of the lowermost sealant stick guide flange. There are 14 downwardly directed air discharge apertures defined through the structure of the ridge to direct heated air from within the cavity of the tubular casing of the nozzle onto the groove formed where the abutting edges of a flooring sheets meet. As the tool is moved in a rearward direction, hot air is forced through the downwardly directed air jet discharge apertures to preheat that portion of the groove that is about to receive molten sealant.

While the Precision Nozzle has been quite effective in sealing flooring seams between some sheet flooring materials, problems have arisen in sealing seams in other flooring materials. More specifically, use of the Precision Nozzle, like many other conventional nozzles that are commercially available, sometimes results in scorching sheet materials on either side of the molten plastic sealant filling the seam. More specifically, scorching can occur when welding seams in either linoleum or rubber flooring. While the Precision Nozzle works quite well on vinyl flooring which is the flooring material most widely used, it does not work well on either linoleum or rubber flooring. Also, some black carbon is produced from the forwardly directed air jets. This carbon becomes entrained in the thermoplastic sealant of the welding rod as it melts, thus resulting in dark spots visible in the seam.

I have now devised a new and superior seam welding tool that employs a uniquely constructed nozzle which is hereinafter referred to herein as the "Universal Nozzle". The Universal Nozzle produces results superior to the Precision Nozzle in that it can be used without problems with all commercially available flooring materials, including linoleum and rubber flooring sheets, as well as vinyl and other flooring materials.

Furthermore, much better coverage is achieved using the Universal Nozzle and seams can be welded 3 times faster with it than with the Precision Nozzle. Indeed, the Universal Nozzle can weld excellent seams between sheets of flooring moving the seam welding tool at a speed of 20 ft. per minute. With handheld seam welding tools employing conventional nozzles, speeds of only about 3 to 4 ft. per minute are possible without deterioration in the quality of the seam. If the workman welding the seam wishes to move slower, he can do so by lowering the temperature in the portable, handheld heating gun in the tool of the present invention.

The Universal Nozzle differs structurally from the Precision Nozzle in several important respects. Specifically, at least 20 downwardly directed, air jet discharge apertures, and preferably 43 such apertures, are formed in the bottom air jet discharge ridge. Moreover, that ridge as it least two and one half inches in length, and preferably at least 3 inches in length, as contrasted to the 1 inch length of the ridge in the Precision Nozzle.

The Universal Nozzle has a gap between the forwardly projecting flanges of at least about 1 inch, as compared to the ⅞ inch width of the gap in the Precision Nozzle. Furthermore, while the Precision Nozzle has 14 forwardly directed air jet discharge apertures in two rows of 7 apertures each, each aperture having a diameter of 0.062 inches, the Universal Nozzle has two rows with 8 forwardly directed air jet discharge port apertures in each row. These apertures are circular and are each 0.086 inches in diameter.

A further distinction of the invention is that the distance between the fin depending from the nozzle casing and the flooring sheets surfaces must be no greater than 0.1875 inches in order for the seams to be of consistently good quality. To this end the device of the invention must include a welding gun carriage that supports the welding gun from beneath so as to maintain this precise distance of separation between the fin and the surface of the floor.

SUMMARY OF THE INVENTION

In one broad aspect the present invention may be considered to be a device for sealing seams between adjoining sheets of flooring located atop a planar floor surface. The device of the invention includes a portable handheld seam sealing welding gun having a body with a longitudinal axis and a forwardly projecting heat conducting member projecting from the body along the longitudinal axis. A hollow heat welding tip is provided and is mounted on the heat conducting member. The welding tip forms a plenum or cavity defined by laterally surrounding side and top walls, a forward perforated end wall, and a hollow, downwardly projecting, elongated fin. The fin extends downwardly from the sidewalls and narrows to terminate in a linear, elongated bottom air jet discharge ridge at least 2.5 inches in length and in which at least 20 circular, downwardly directed air jet discharge apertures are defined. Two parallel rows of at least 8 forwardly directed air jet discharge apertures are defined in the forward, perforated end wall of the welding tip.

The device is further comprised of a pair of glue stick guide flanges projecting forwardly from the laterally surrounding walls, one above and one below the end wall. A glue stick guide aperture is defined in each of the guide flanges to receive a glue stick and guide the glue stick to move generally parallel to the end wall and to hold the glue stick in close proximity to the forwardly directed air jet discharge apertures in front of the end wall.

The device of the invention also includes a welding gun carriage supporting the welding gun from beneath and having a pair of laterally separated stabilizing rollers and a guide element. The guide element projects downwardly into seams between the sheets of flooring. The welding gun carriage holds the welding gun elevated above the adjoining sheets of flooring with the linear air jet discharge ridge on the welding tip inclined at an angle of between about 1° and 5° upwardly and rearwardly relative to the flange located below the transverse forward end wall. The air jet discharge ridge is preferably located no greater than about 0.1875 inches from the sheets of flooring.

In another broad aspect the invention may be considered to be a device for dispensing melted glue into seams between adjacent sheets of flooring. The device is comprised of a portable handheld heat gun with a hollow glue heating nozzle of unique configuration, and a carriage supporting the heat gun from beneath.

The heat gun has a body with front and rear ends aligned a long a longitudinal axis. The hollow glue heating nozzle is mounted on the front end of the heat gun. The nozzle defines a hollow, laterally enclosing casing that defines a cavity therewithin. The casing terminates in a transverse front end wall formed with two rows of forwardly directed air jet ports with it least 8 air jet ports in each row. The rows reside on opposite sides of and are parallel to the longitudinal axis of the heat gun body. The nozzle further comprises a downwardly directed, hollow fin that narrows from the casing and terminates in a narrow, downwardly facing floor wall at least a 2.5 inches in length. The floor wall is perforated by a line of at least about 20 downwardly directed air discharge apertures therethrough.

An upper forwardly projecting flange extends from the casing above the front end wall. Also, a lower forwardly projecting flange extends from the casing below the front end wall. The flanges have guide loops defined therein to receive a glue stick and guide it past and in front of the front end wall in close proximity to the forwardly directed air jet ports with progressive movement of the glue stick from the upper flange toward the lower flange.

The carriage supports the heat gun at a fixed inclined orientation relative to the sheets of flooring and holds the downwardly facing floor wall at an angle of between about 1° and 5° relative to and sloping upwardly and rearwardly from the lower flange. The carriage includes a seam follower that depends into the seams between the adjacent sheets of flooring, and a pair of rollers laterally spaced from each other on opposite sides of the seam follower. The rollers reside in rolling contact with the sheets of flooring. The carriage holds the heat gun such that the longitudinal axis of the heat gun resides directly above the seam follower.

In still another broad aspect the invention may be considered to be a device for heating welding seams between adjacent sheets of flooring. The device is comprised of an elongated, portable, handheld heat welding gun, a hollow, elongated heat welding nozzle, and a carriage supporting the heat welding gun. The heat welding gun has front and rear ends oriented along a longitudinal axis of alignment. The nozzle is mounted on the front end of the heat welding gun and includes a tubular shaped, enclosing shell with front and rear ends and with a hollow fin projecting downwardly and narrowing from the shell to form a linear floor beam. At least 20 air jet apertures are defined through the floor beam. The floor beam is at least about 2.5 inches in length. The rear end of the tubular shell is mounted on the front end of the heat welding gun. The front end of the tubular shell is closed by a front end wall having at least two parallel rows of forwardly facing air jet apertures defined therethrough. One row lies on either side of the longitudinal axis. Each row has at least eight of the forwardly facing air jet apertures.

The heat welding nozzle is further comprised of a pair of forwardly projecting glue stick guide flanges. These include an upper flange located above the rows of forwardly facing air jet apertures and a lower flange located below the rows of forwardly facing air jet apertures. Each of the flanges has a glue stick receiving loop defined therein. The loops guide a glue stick therethrough toward the flooring seams so that it passes in close proximity to and in spaced separation from and in front of the forwardly facing air jet apertures.

The carriage supports the heat welding gun from beneath in a fixed inclined orientation relative to the lower flange and holds the downwardly facing floor beam at an angle of between about 1° and 5° relative to the lower flange. The carriage includes a pair of rollers for contacting the sheets of flooring. The rollers are laterally spaced equidistant from the longitudinal axis of alignment on opposing sides thereof. The carriage includes a seam follower held on the carriage centered between the rollers so that it rides in the seams and the carriage holds the heat gun such that the longitudinal axis is located directly vertically above the seam follower.

The invention may be described with greater clarity and particularity by reference to the accompanying drawings.

DESCRIPTION OF THE EMBODIMENT

Figure 1:
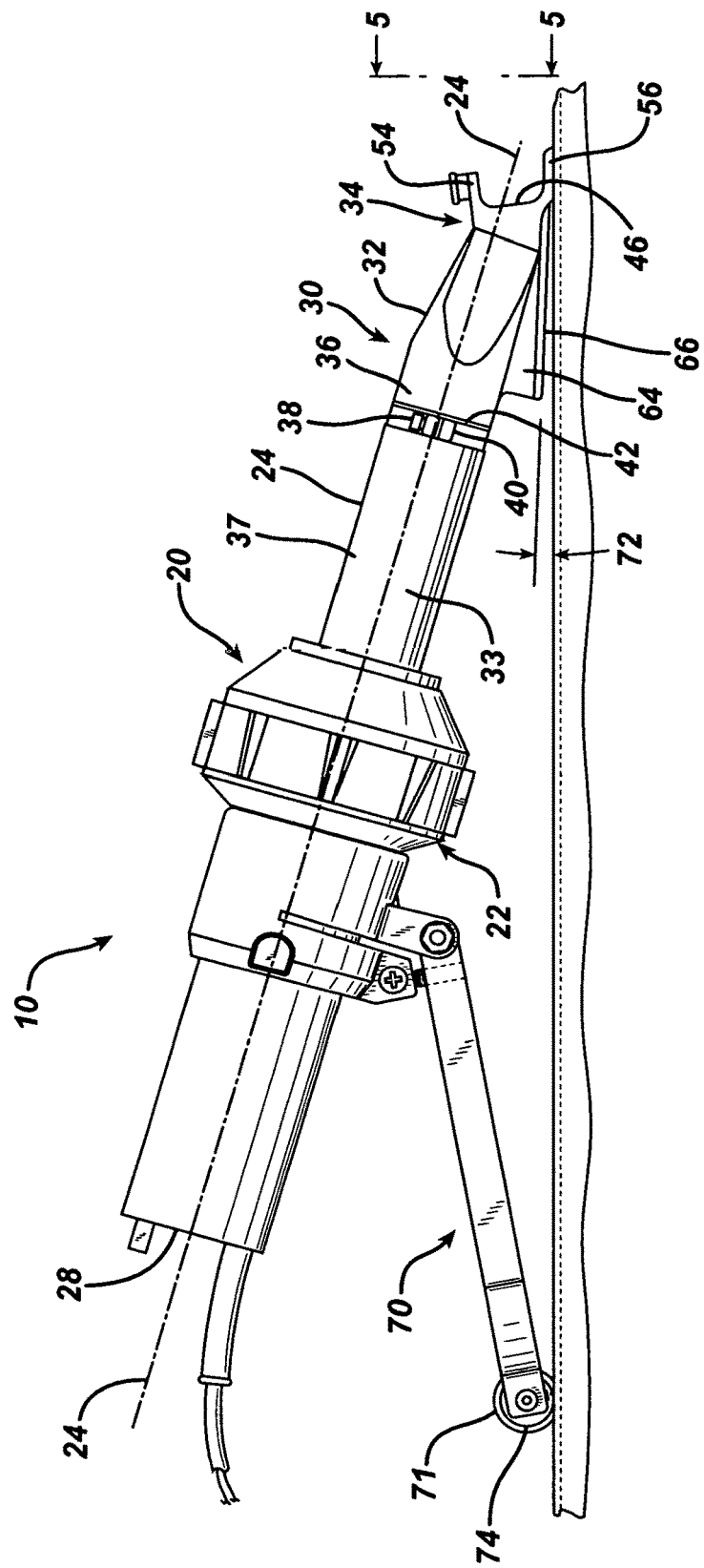
FIG. 1 is a side elevational view of a preferred embodiment of the device of the invention.
Figure 2:
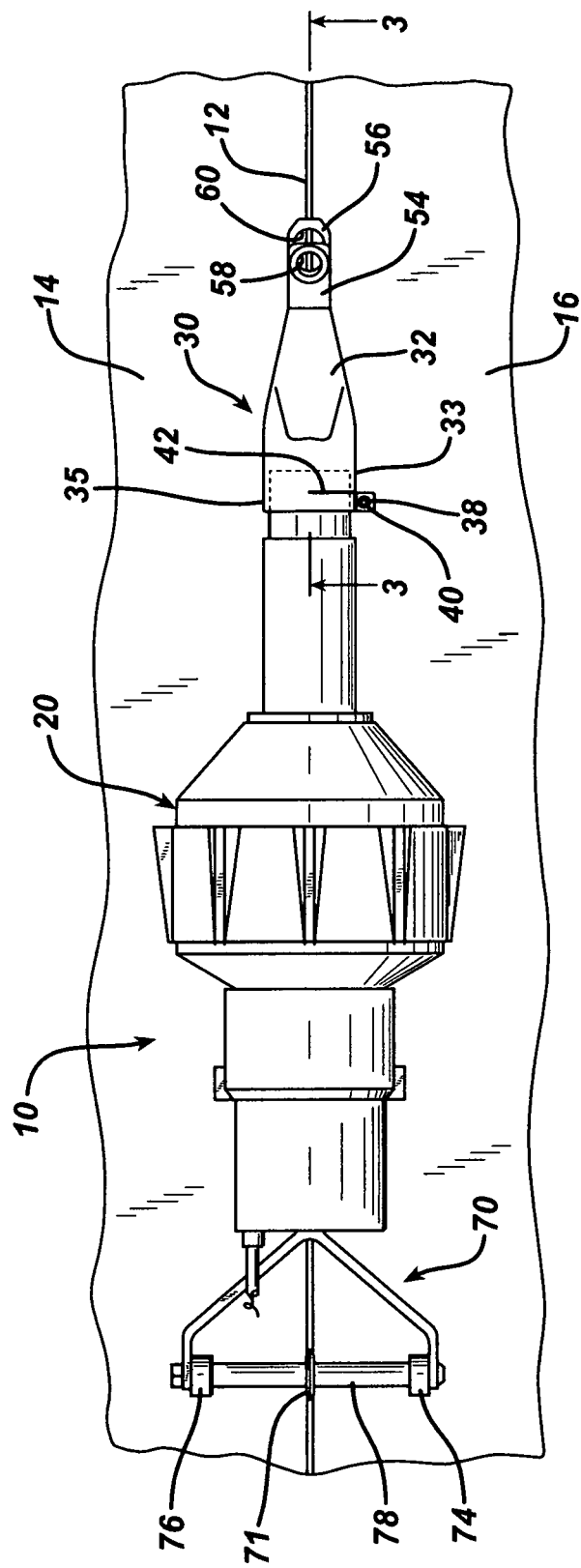
FIG. 2 is a top plan view thereof.
Figure 3:
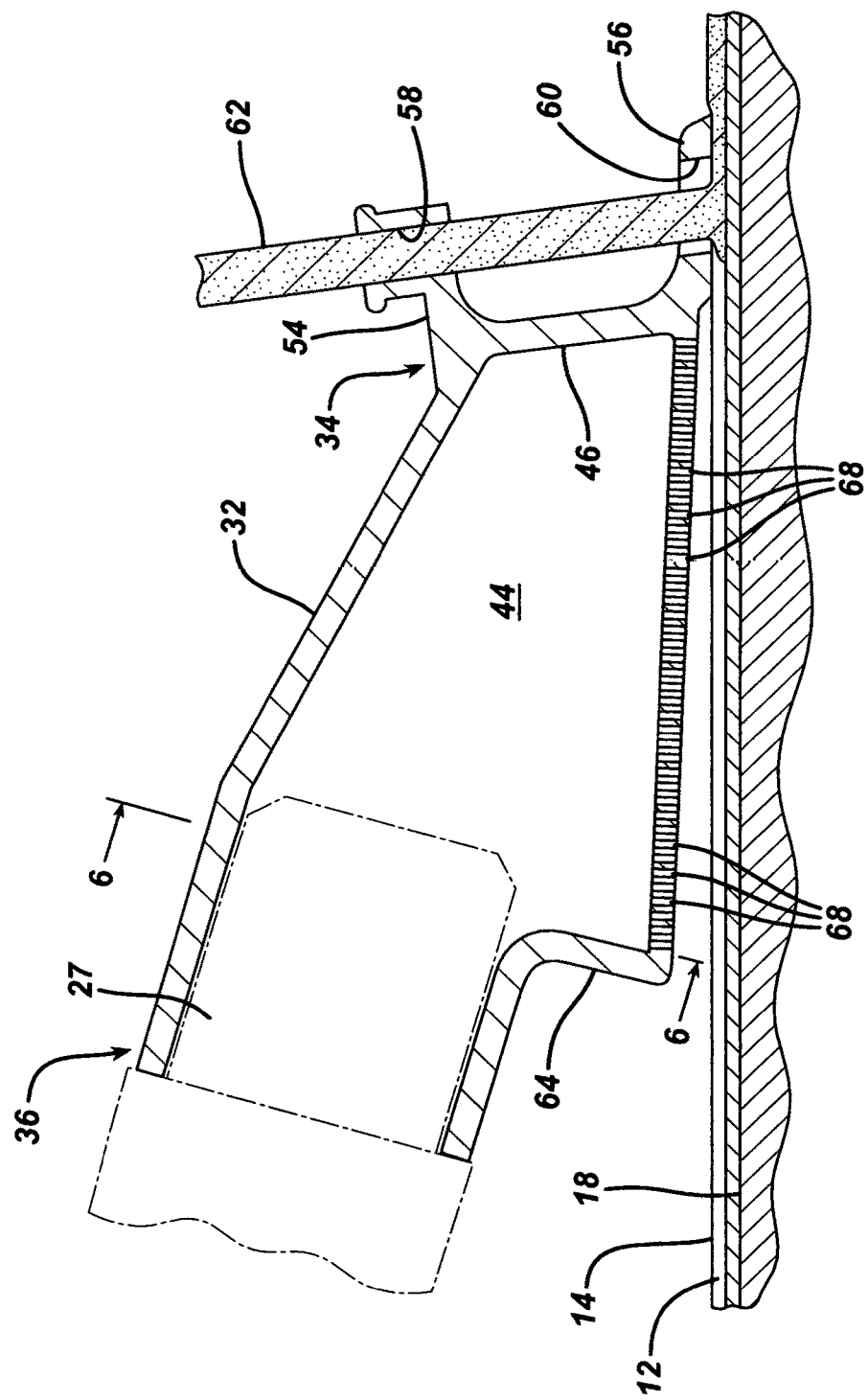
FIG. 3 is a side sectional detail of the heat welding nozzle of the invention taken along the lines 3-3 of FIG. 2.

FIGS. 1, 2 and 3 illustrate a device 10 for sealing seams 12 between adjoining sheets of flooring 14 and 16 located atop a planar floor surface 18. The device 10 is comprised of a portable handheld seam sealing welding gun 20, a hollow heat welding tip 30, and a welding gun carriage 70.

The heat welding gun 20 may be a conventional commercially available Liester Triac model portable, handheld floor seam welding gun, although other similar conventional seam welding guns may be used in its place. The welding gun 20 has a body 22 with a longitudinal axis 24 and a forwardly projecting heat conducting member 26. The heat welding gun 20 has a front end 27 at the forward extremity of the heat conducting member 26 and a rear end 28.

The heat welding nozzle 30 is a hollow, tubular structure for heating glue that is dispensed into grooves formed at seams 12 between the adjoining sheets 14 and 16 of flooring. The heat welding nozzle 30 is constructed of a rigid, enclosing shell or casing 32 with a front end 34 and a rear end 36. The heat welding nozzle 30 is preferably constructed of cast-iron.

The rear end 36 of the nozzle shell 32 is mounted on the front end 27 of the heat welding gun 20 and clamped in position by a conventional fastening screw 38 that extends through apertures in a pair of ears 40 that extend radially from the shell 32 at the rear and 36 thereof. The ears 40 are located adjacent a radial slot 42 defined in the structure of the shell 32 at the rear end 36 thereof to releasably clamp the nozzle 30 onto the front and 27 of the heat welding gun 20, in a conventional manner.

Figure 5:
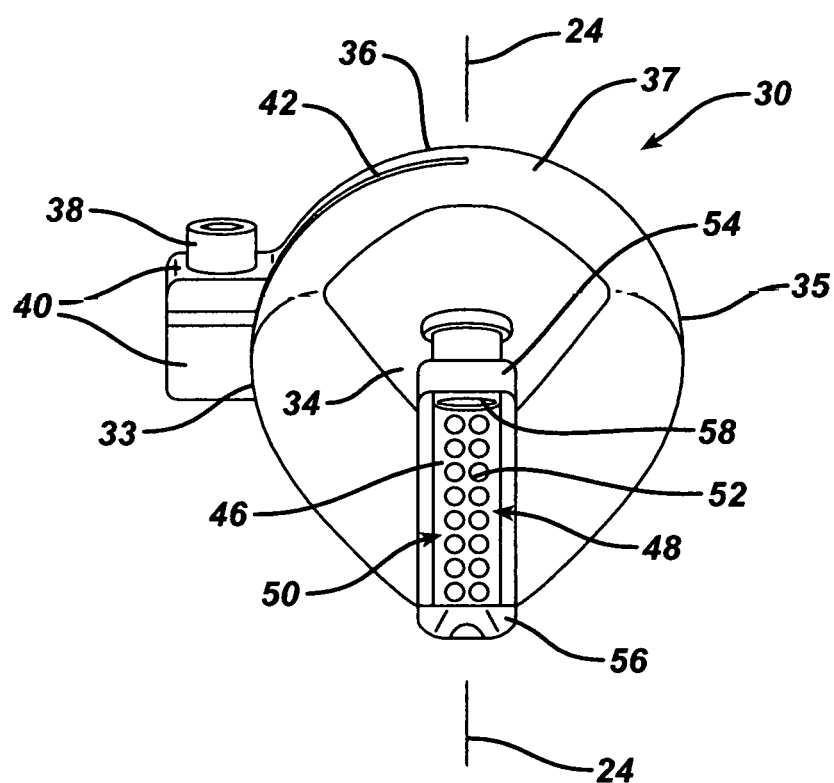
FIG. 5 is a transverse elevational detail of the nozzle of the invention taken along the lines 5-5 of FIG. 1.

The laterally enclosing casing 32 defines a cavity 44 therewithin which serves as a heat distribution plenum. The cavity 44 is surrounded by side walls 33 and 35 and a top wall 37 of the casing 32. The casing 32 terminates in a transverse, perforated front end wall 46 which is formed with two rows 48 and 50 of apertures that are air jet ports 52. At least eight forwardly directed air jet ports 52 are defined in each of the rows 48 and 50. The rows 48 and 50 reside on opposite sides of and are parallel to the longitudinal axis 24, as illustrated in FIG. 5. Each of the forwardly facing and forwardly directed air jet ports 52 has a circular configuration and is about 0.086 inches in diameter.

The heat welding nozzle 30 is further comprised of a pair of forwardly projecting glue stick guide flanges, including an upper flange 54 located above the rows 48 and 50 of forwardly facing air jet apertures 52, and a lower flange 56 located below the rows 48 and 50 of forwardly facing air jet apertures 52. The glue stick guide flanges 54 and 56 are located at least about 1 inch apart from each other.

Figure 6:
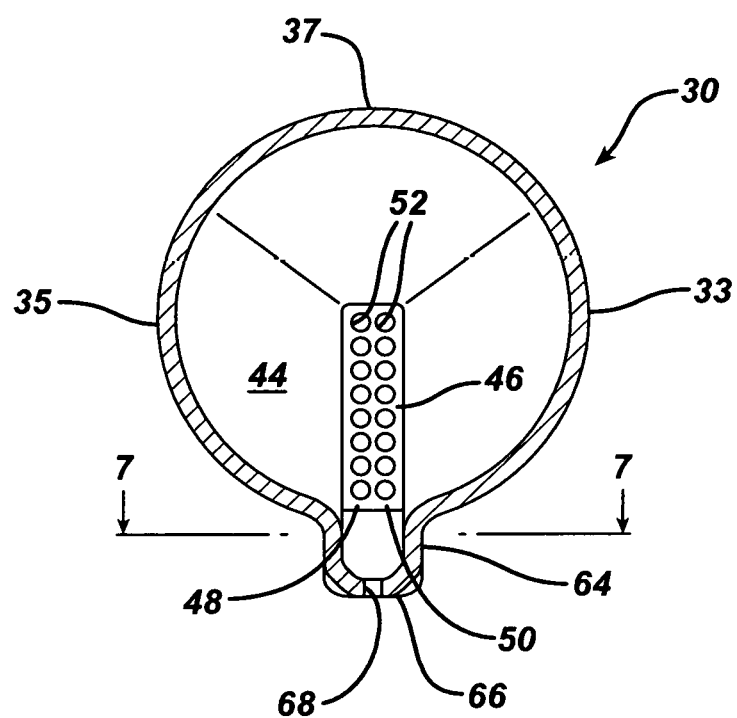
FIG. 6 is a transverse sectional detail of the heat nozzle of the invention taken along the lines 6-6 of FIG. 3.
Figure 7:
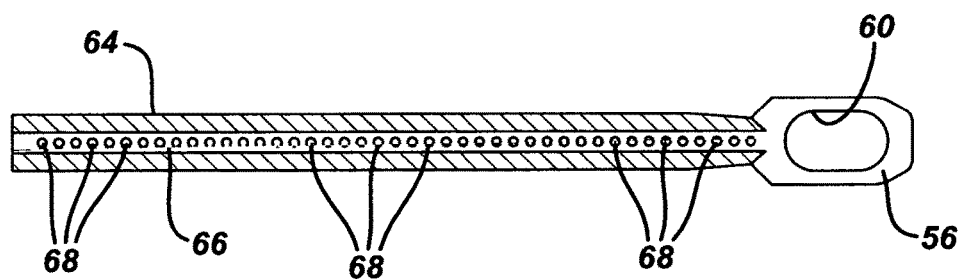
FIG. 7 is a top plan, sectional detail of the heat nozzle of the invention taken along the lines 7-7 of FIG. 6.
Figure 8:
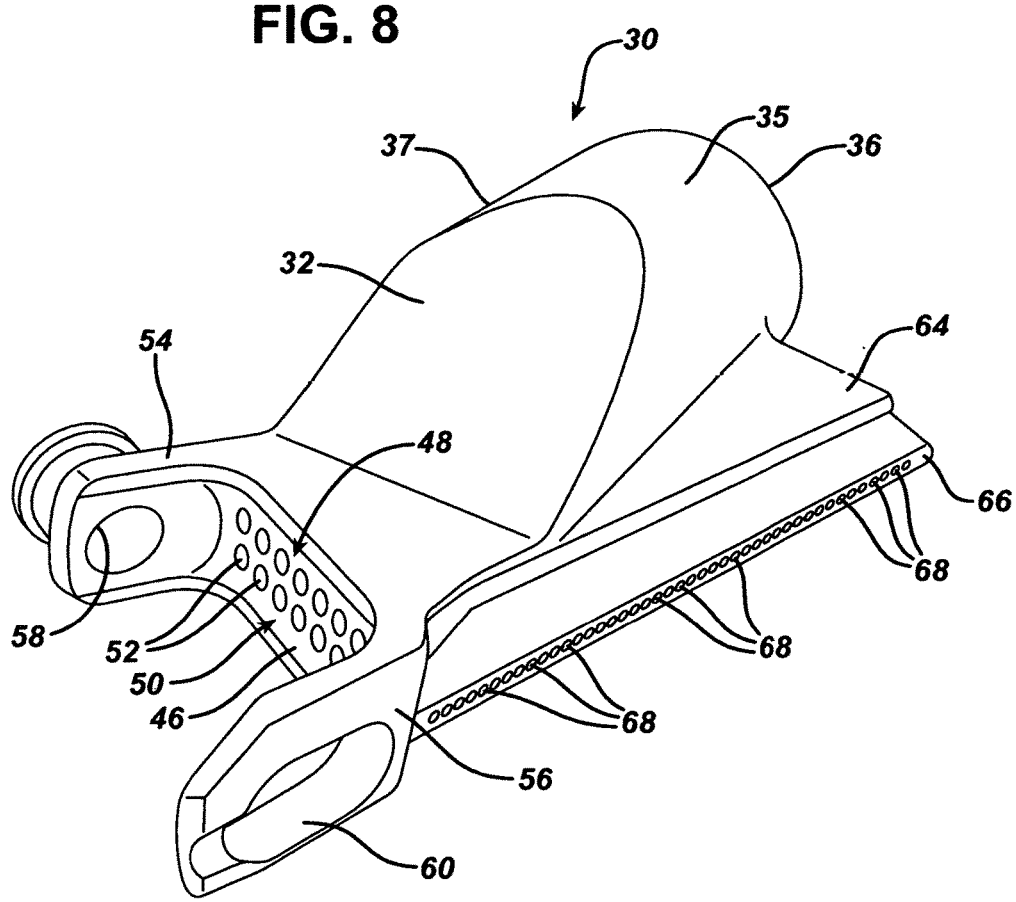
FIG. 8 is a perspective view of the heat welding gun nozzle of the invention shown in isolation from the other parts of the device of the invention.

Each of the flanges 54 and 56 has a glue stick receiving loop defined therein. The upper flange 54 as a glue stick receiving loop 58 while the lower flange 56 has a glue stick receiving loop 60. Together the glue stick receiving loops 58 and 60 receive and guide a glue stick 62 therethrough and toward the flooring seam 12 as illustrated in FIG. 3. Referring to FIGS. 3 and 6, the glue stick 62 passes in close proximity to and in spaced separation from the forwardly facing air jet apertures 52 and in front of the front end wall 46. The passage occurs with progressive movement of the glue stick 62 from the upper flange 54 toward the lower flange 56. The guide loops 54 and 56 are spaced a distance of about 0.1875 inches from the transverse front end wall 46 so that the facing outer surface of the glue stick 62 is spaced from the front end wall 46 that same distance of about 0.1875 inches.

Figure 4:
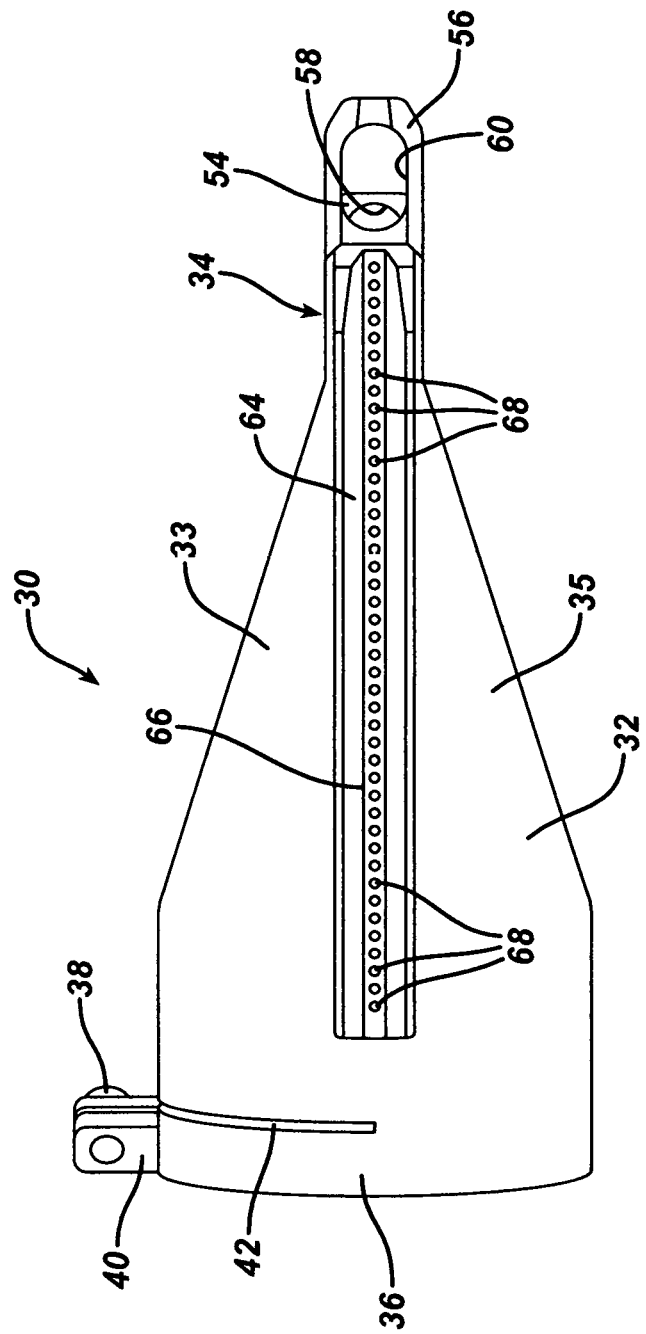
FIG. 4 is a bottom plan view of the heat welding nozzle of the invention.

The casing 32 of the nozzle 30 is further comprised of a downwardly directed elongated, hollow fin 64 that narrows at its lower extremity from the casing 32 to form a narrow, downwardly facing floor 66, as viewed from inside the cavity 44 in FIG. 6. The same structure is a ridge or beam, when viewed from the exterior of the nozzle 30, as shown in FIG. 4. The floor wall or ridge 66 is at least 2.5 inches in length, and preferably at least 3 inches in length, as measured from the lower flange 56. The floor wall or ridge 66 is perforated by a line of at least 20, and preferably no fewer than 30 downwardly directed air discharge apertures 68. In the preferred embodiment the floor ridge 66 has 43 circular, downwardly directed air jet discharge apertures 68. Each of the 43 downwardly directed air discharge apertures 68 is about 0.048 inches in diameter.

The carriages 70 supports the heat gun 20 from beneath elevated above the adjoining sheets 14 and 16 of flooring so that the linear ridge 66 on the welding tip 30 is inclined at an angle 72 of between about 1° and 5° upwardly and rearwardly relative to the lower flange 56 that is located below the transverse and wall 46, as illustrated in FIG. 1. The carriage 70 must be adjusted so that the rear end of the bottom air jet discharge ridge 66 is located no more than about 0.1875 inches from the sheets 14 and 16 of flooring. The carriage 70 supports the heat welding gun 20 in a fixed inclination relative to the lower flange 56 when the tool of the invention is deployed, as shown in FIG. 1.

The carriage 70 includes a seam follower 71, which is preferably formed in the shape of a narrow disk, and a pair of rollers 74 and 76 laterally separated and spaced equidistant from each other and from the seam follower 71 as illustrated in FIG. 2. The carriage 70 has a roller axle 78 upon which the rollers 74 and 76, as well as the seam follower 71, are mounted. When the device 10 of the invention is deployed as shown in FIG. 1, the seam follower 71 depends into the seams 12 between adjacent sheets 14 and 16 of flooring, as illustrated in FIGS. 1 and 2. The carriage 70 holds the heat gun 20 such that the longitudinal axis 24 of the heat gun 20 resides in coplanar relationship with and directly above the seam follower 71, as illustrated in FIG. 2.

To operate the device 10 the seam welding gun 20 is secured to the carriage 70 as illustrated in FIG. 1 with the welding gun 20 supported at an angle of inclination relative to the flooring sheets 14 and 16 so that the angle 72 is between 1° and 5°, preferably about 3°.

The heat welding gun 20 is powered on so that heated air is directed into the cavity 44 of the nozzle 30. After a short preheating period, a glue stick 62 is inserted into the glue stick receiving loops 58 and 60 of the flanges 54 and 56 directly above the seam and 12 to be sealed, as shown in FIG. 3. The device 10 is then pulled rearwardly, to the left as illustrated in FIG. 1. Heated air is blown into the cavity 44 and emanates from the nozzle 30 through both the forwardly directed aired jet discharge apertures 52 in the front end wall 46 and the downwardly directed air jet discharge apertures 68 in at the floor ridge 66 at the bottom of the fin 64.

As the device 10 is drawn rearwardly the glue in the glue stick 62 is melted from a solid to a molten state and is discharged into the groove formed at the seam 12. Meanwhile, hot air emanating through the downwardly directed air jet discharge apertures 68 is preheating the area of the seam 12 that is about to receive the molten sealant from the glue stick 62. The device 10 is drawn rearwardly along the entire length of the seam 12 until this groove at the seam 12 has been filled with molten sealant flowing into it. Once the device 10 is moved away the molten sealant quickly congeals to a solidified form and of bonds tightly to the mutually facing edges of the flooring sheets 14 and 16. Due to the open space of about 0.1875 inches between the front and 46 of the casing 32 and the facing surface of the glue stick 64, and also because of the controlled temperature that the jets of air emanating through the forwardly facing air jet apertures 52 exert on the sealant of the glue stick 62, carbon spotting is avoided. Furthermore, because of the substantial length of the portion of the seam 12 that is preheated immediately to the rear and in the path of the molten sealant, the device 10 can be moved relatively rapidly, up to about 20 linear feet per minute while maintaining an excellent bond of the glue to the flooring sheets 14 and 16. This is accomplished without scorching either the sealant or the edges of the sheets of flooring joined by the sealant.

The device 10 can be utilized with all types of sheet flooring, not just vinyl. To the contrary, it performs equally well when sealing seams in linoleum, rubber, sport floors and many other commercially available floorings surfaces.

Undoubtedly, numerous variations and modifications of the invention will become readily apparent to those familiar with portable, handheld flooring seams sealing devices. Accordingly, the scope of the invention should not be construed as limited to this specific embodiment depicted and described, but rather as defined in the claims appended hereto.

I claim:

1. A device for sealing seams between adjoining sheets of flooring located atop a planar floor surface comprising:
   a portable handheld seam sealing welding gun having a body with a longitudinal axis and a forwardly projecting heat conducting member projecting from said body along said longitudinal axis,
   a hollow heat welding tip mounted on said heat conducting member and which forms a plenum defined by laterally surrounding side and top walls, a forward perforated end wall, and a hollow downwardly projecting, elongated fin that extends downwardly from said sidewalls and narrows to terminate in a linear, elongated bottom air jet discharge ridge at least 2.5 inches in length and in which at least 20 circular, downwardly directed, air jet discharge apertures are defined, and two parallel rows of at least 8 forwardly directed air jet discharge apertures are defined in said forward, perforated end wall,
   and further comprising a pair of glue stick guide flanges projecting forwardly from said laterally surrounding walls, one above and one below said end wall, wherein a glue stick guide aperture is defined in each of said guide flanges to receive a glue stick and guide said glue stick to move generally parallel to said end wall and hold said glue stick in close proximity to and in front of said forwardly directed air jet discharge apertures, and
   a welding gun carriage supporting said welding gun from beneath and having a pair of laterally separated stabilizing rollers and a guide element, and said guide element projects downwardly into said seams between said sheets of flooring, and said welding gun carriage holds said welding gun elevated above said adjoining sheets of flooring with said linear air jet discharge ridge on said elongated fin inclined at an angle of between about 1° and 5° upwardly and rearwardly relative to said flange located below said foreword, perforated end wall.

2. A device according to claim 1 wherein at least 30 circular downwardly directed air jet discharge apertures are defined in said air jet discharge ridge and said air jet discharge ridge is at least 2.5 inches in length.

3. A device according to claim 2 wherein 43 circular downwardly directed air jet discharge apertures are defined in said air jet discharge ridge and said air jet discharge ridge is at least 3 inches in length.

4. A device according to claim 3 wherein each of said 43 circular downwardly directed air jet discharge apertures is about 0.048 inches in diameter and said carriage holds said welding gun elevated above said adjoining sheets of flooring with said linear air jet discharge ridge on said welding tip fin inclined at an angle of about 3° upwardly and rearwardly relative to said flange located below said foreword, perforated end wall.

5. A device according to claim 4 wherein said glue stick guide flanges are located about 1 inch apart from each other and said forwardly directed air jet discharge apertures are circular in configuration and are each about 0.086 inches in diameter.

6. A device for dispensing melted glue into seams between adjacent sheets of flooring comprising:
   a portable handheld heat gun having a body with front and rear ends aligned along a longitudinal axis, and
   a hollow glue heating nozzle mounted on said front end of said heat gun and defining a hollow, laterally enclosing casing that terminates in a transverse front end wall formed with two rows of forwardly directed air jet ports with at least 8 air jet ports in each row and said rows reside on opposite sides of and are parallel to said longitudinal axis, and said nozzle further comprises a downwardly directed elongated, hollow fin that narrows from said casing and terminates in a narrow, downwardly facing floor wall at least 2.5 inches in length and said floor wall is perforated by a line of at least about 20 downwardly directed air discharge apertures therethrough,
   an upper forwardly projecting flange extending from said casing above said front end wall and a lower forwardly projecting flange extending from said casing below said front end wall, and said flanges have guide loops defined therein to receive a glue stick and guide said glue stick past said front end wall in close proximity to and forwardly from said forwardly directed air jet ports with progressive movement of said glue stick from said upper flange toward said lower flange, and a carriage supporting said heat gun from beneath at a fixed, inclined orientation relative to said sheets of flooring and holding said downwardly facing floor wall at an angle of between about 1° and 5° relative to and sloping upwardly and rearwardly from said lower flange, and said carriage includes a seam follower that depends into said seams between said adjacent sheets of flooring, and a pair of rollers laterally spaced from each other on opposite sides of said seam follower for residing in rolling contact with said sheets of flooring, whereby said carriage holds said heat gun such that said longitudinal axis of said heat gun resides directly above said seam follower.

7. A device according to claim 6 wherein said guide loops are spaced a distance of about 0.1875 inches from said transverse front end wall.

8. A device according to claim 6 wherein at least 30 circular downwardly directed, air jet discharge apertures are defined in said floor wall and said floor wall is at least 3 inches in length.

9. A device according to claim 8 wherein 43 circular downwardly directed air jet discharge apertures are defined in said floor wall.

10. A device according to claim 9 wherein each of said 43 circular downwardly directed air jet discharge apertures is about 0.048 inches in diameter.

11. A device according to claim 10 wherein said projecting flanges are located about 1 inch apart from each other and said forwardly directed air jet ports are circular in configuration and are each about 0.086 inches in diameter.

12. A device for heat welding seams between adjacent sheets of flooring comprising:
   an elongated, portable, handheld heat welding gun having front and rear ends oriented along a longitudinal axis of alignment and,
   a hollow, elongated heat welding nozzle mounted on said front end of said heat welding gun and including a tubular shaped cavity enclosing shell with front and rear ends and a hollow fin projecting downwardly from said shell and narrowing to form a linear floor beam defining therethrough at least 20 air jet apertures and said the floor beam is at least about 2.5 inches in length, and said rear end of said tubular shell is mounted on said front end of said heat welding gun, and said front end of said tubular shell is closed by a front end wall having at least two parallel rows of forwardly facing air jet apertures defined therethrough, one row lying on either side of said longitudinal axis, each row having at least 8 of said forwardly facing air jet apertures, said heat welding nozzle further comprising a pair of forwardly projecting glue stick guide flanges, including an upper flange located above said rows of forwardly facing air jet apertures, and a lower flange located below said rows of forwardly facing air jet apertures, wherein each of said flanges has a glue stick receiving loop defined therein to guide a glue stick therethrough toward said flooring seams so that said glue stick passes in close proximity to and in spaced separation forwardly from said forwardly facing air jet apertures, and
   a carriage supporting said heat welding gun from beneath in a fixed inclined orientation relative to said the lower flange and holding said downwardly facing floor beam at an angle of between about 1° and 5° relative to said lower flange, and said carriage includes a pair of rollers for contacting said sheets of flooring laterally separated and equidistant from said longitudinal axis of alignment on opposing sides thereof, and a seam follower held by said carriage centered between said rollers and so that said seam follower rides in said seams and said carriage holds said heat gun such that said longitudinal axis is located directly vertically above said seam follower.

13. A device according to claim 12 wherein said guide loops are spaced a distance of about 0.1875 inches from said front end wall.

14. A device according to claim 12 wherein at least 30 circular downwardly directed, air jet discharge apertures are defined in said floor beam and said floor beam is at least 3 inches in length.

15. A device according to claim 14 wherein 43 circular downwardly directed air jet discharge apertures are defined in said floor beam and said floor beam is at least 3 inches in length.

16. A device according to claim 15 wherein each of said 43 circular downwardly directed air jet discharge apertures is about 0.048 inches in diameter.

17. A device according to claim 16 wherein said upper and lower flanges are located about 1 inch apart from each other and said forwardly facing air jet apertures are circular in configuration and are each about 0.086 inches in diameter.

18. A device according to claim 17 wherein said carriage holds said linear floor beam inclined at an angle of about 3° relative to said lower flange.

* * * * *